United States Patent [19]

Umeda

[11] Patent Number: 4,879,447
[45] Date of Patent: Nov. 7, 1989

[54] PISTON ACTUATED WELDING GUN WITH PIVOTING ARM

[75] Inventor: Shigeru Umeda, Kanagawa, Japan

[73] Assignee: Obara Corporation, Tokyo, Japan

[21] Appl. No.: 234,477

[22] Filed: Aug. 19, 1988

[30] Foreign Application Priority Data

Feb. 3, 1988 [JP] Japan ................... 63-21873

[51] Int. Cl.$^4$ ............................................. B23K 11/10
[52] U.S. Cl. .................................... 219/86.25; 219/89
[58] Field of Search ............... 219/86.25, 86.33, 89, 219/90

[56] References Cited

U.S. PATENT DOCUMENTS

| | | | |
|---|---|---|---|
| 4,410,782 | 10/1983 | Kanno et al. | 219/89 |
| 4,531,041 | 7/1985 | Larsson | 219/90 |
| 4,728,767 | 3/1988 | Hayashi | 219/89 |
| 4,771,160 | 9/1988 | Pitsch et al. | 219/90 |

FOREIGN PATENT DOCUMENTS 62-64480 3/1987 Japan.

*Primary Examiner*—A. D. Pellinen
*Assistant Examiner*—David Osborn
*Attorney, Agent, or Firm*—Flynn, Thiel, Boutell & Tanis

[57] ABSTRACT

A welding gun comprises a fixed arm having an electrode at an end thereof and integrated with a cylinder at the other end thereof and a pin at the middle portion of the fixed arm for swingably mounting the fixed arm on a base, the cylinder having a piston provided with a rod at the distal end thereof; a movable arm having an electrode at an end thereof opposite to the electrode of the fixed arm, a pin at the other end thereof for connecting the movable arm to the rod of the piston, and a pin at the middle portion of the movable arm; and a link connecting the pins respectively provided at the middle portions of the fixed arm and the mocable arm for pivotally connecting the fixed arm to the movable arm.

10 Claims, 2 Drawing Sheets

PISTON ACTUATED WELDING GUN WITH PIVOTING ARM

BACKGROUND OF THE INVENTION

1. Field of the Invention

The present invention relates to an improvement of a welding gun.

2. Description of the Prior Art

Japanese Patent Laid-Open Publication No. 62-64480 discloses a prior welding gun which will be described hereafter with reference to FIG. 3.

The prior welding gun comprises a fixed arm having an electrode at one end thereof, a movable arm 15 composed of an upper portion having an electrode at one end thereof which is opposed to the electrode of the fixed arm, and a lower portion fixed to the upper portion at one end thereof, and connected at the other end thereof to the distal end of the rod 14 of a piston in a cylinder by a link 22. The lower portion of the movable arm 15 has rollers 16, 17. A guide plate provided with the guide groove 18 for guiding guide rollers 16, 17 is fixedly mounted over the cylinder.

The guide groove 18 comprises a rod guide member 19 an axis of which is aligned with that of the rod 14, a middle guide member 20 an axis of which is spaced with a predetermined interval from and in parallel with that of the rod 14, and a circular arc member 21 disposed opposite to the rod guide member 19 and spaced with a predetermined interval.

The prior welding gun has an advantage that the movable arm can be moved away from the fixed arm with a large angle or a long distance by a slight reciprocal movement of the rod, but has a disadvantage that not only complicated components such as the guide roller, the guide plate, and the guide groove are required which entails in requiring a large-sized welding gun, but also many parts are required since a force applied to the piston in the cylinder during the backward movement of the rod is less than that during the forward movement of the rod for the cross sectional area of the rod. As a result, there is a likelihood that the pressing force will be reduced. To overcome the disadvantage, the cylinder will be large sized or the pressure of the operating fluid is increased.

SUMMARY OF THE INVENTION

It is therefore an object of the present invention to provide a welding gun enabling a movable arm to move in a large angle or a long distance relative to a fixed arm with a slight reciprocal movement of a rod attached to a piston without employing a complicated mechanism such as the guide roller, the guide plate, and the guide groove employed in the prior welding gun. A pressing force applied to a workpiece by the movable arm is generated by a forward movement of the rod.

To achieve the object of the present invention, the welding gun comprises a fixed arm having an electrode at an end thereof and integrated with a cylinder at the other end thereof a movable arm having an electrode at an end thereof and provided opposite to the fixed arm and pivotally connected at the other end thereof to a rod of a piston within the cylinder, and a link pivotally connected to the fixed arm and the movable arm.

The above and other objects, features and advantages of the present invention will become more apparent from the following description taken in conjunction with the accompanying drawings.

PREFERRED EMBODIMENT OF THE PRESENT INVENTION

Figure 1:
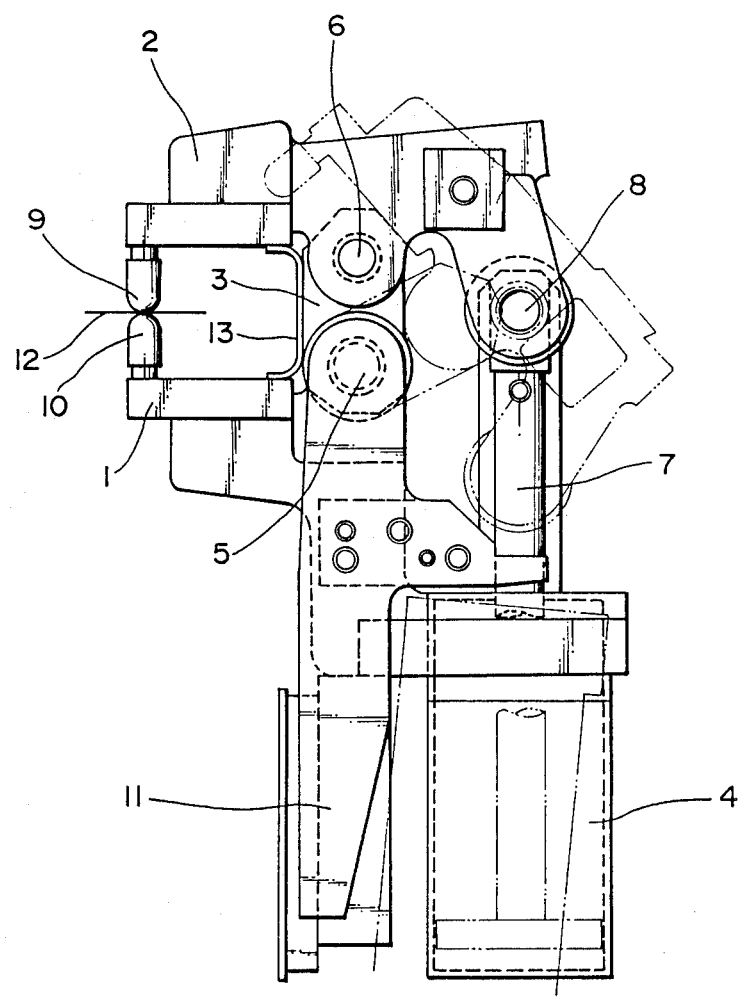
FIG. 1 is a side view of a welding gun according to the present invention in which a movable arm is closed (solid line) and opened (dotted line) relative to a fixed arm.

A welding gun according to an embodiment of the present invention will be described with reference to FIGS. 1 and 2.

The welding gun comprises a fixed arm 1, which can be equalized, having an electrode 10 at an end thereof, a pin 5 provided at a middle portion thereof about which pin 5 the fixed arm 1 is swingably mounted on a support 11, and fixed to a housing of a cylinder 4 at the other end thereof; a movable arm 2 having an electrode 9 at an end thereof and provided opposite to the fixed arm 1 and a pin 8 at the other end thereof for pivotally connecting the movable arm to a piston within the cylinder 4, and a link 3 pivotally connecting the fixed arm 1 to the movable arm 2.

More in detail, the welding gun comprises a fixed arm 1 having an electrode 10 at one end thereof and integrated with a cylinder 4 at the other end thereof which has inside thereof a piston provided with a rod 7 at a distal end thereof and having a pin 5 provided at a middle portion of the fixed arm 1 for swingably mounting the fixed arm 1 on a base 11; the movable arm 2 having an electrode 9 at the end thereof opposed to the electrode 10 of the fixed arm 1, a pin 8 at the other end thereof which is formed by penetrating the other end of the movable arm 2 and pivotally connects the movable arm 2 to the rod 7, and a middle portion having a pin 6 disposed between the electrode 9 and the pin 8; and the link 3 which extends between and has the pins 5 and 6 provided at opposite ends thereof. The pins 5, 6 respectively penetrate the middle portions of the fixed and movable arms 1, 2. The movement of the link 3 is restricted by a stopper 13 provided on the fixed arm 1.

The movement of the movable arm 2 will be described with reference to FIGS. 1 and 2.

Inasmuch as the cylinder housing 4 is fixed with the fixed arm 1, when the fluid under pressure is supplied into or discharged from the cylinder 4, the rod 7 and the rear end of the movable arm 2 connected by the pin 8 are linearly and vertically moved. Accompanied by the movement, the pin 6 is moved in a circular arc about the pin 5.

Figure 2:
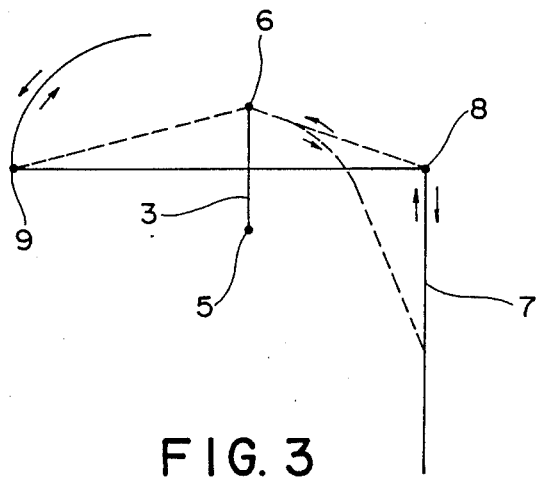
FIG. 2 is a view showing a trace of movement of a movable arm relative to a fixed arm according to an embodiment of the present invention.
Figure 3:
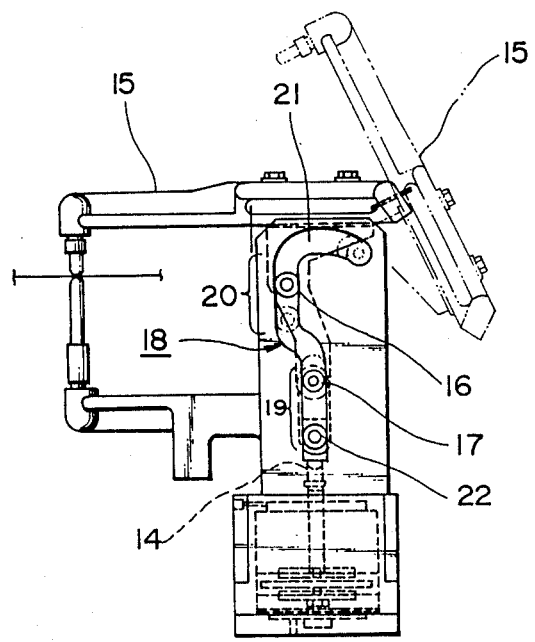
FIG. 3 is a side view of a prior welding gun in which a movable arm is closed (solid line) and opened (dotted line) relative to a fixed arm.

Accordingly, the movement trace of a tip end of the movable arm 2 is a composition of a linear movement of the pin 8 of the movable arm 2 and a circular arc movement of the pin 6 accompanied by the linear movement of the pin 8 as shown in FIG. 2. That is, when the welding operation is completed, the pin 8 is slightly lowered by a slight backward movement of the rod 7, whereby the pin 6 is moved slightly clockwise about the pin 5 with the radius which is equal to a length of the link 3. The composite force of the pins 8, 6 accompanied by the slight movement of the pins 8, 6, is applied to the elecrode 9 which is upwardly moved. With further backward movement of the rod 7, the movement direction of the electode 9 is gradually changed from the upward movement to the lateral movement.

Accordingly, the electrode 9 is first quickly moved upwardly, and gradually moved in the lateral direction. Thus, the movable arm 2 is positioned finally as shown in dotted line in FIG. 1 so that the welded workpiece 12 can be removed from the electrodes and a new workpiece can be inserted between the electrodes 9, 10.

At the time when the inserted workpiece 12 will be subjected to a welding operation, fluid under pressure is introduced below the piston into a lower portion of the cylinder 4 and the fluid under pressure above the piston is discharged so that the rod 7 moves linearly and upwardly. With the upward movement of the rod 7, a movement trace of the tip end of the movable arm is effected in the manner reverse to the backward movement of the tip end of the rod 7, namely, the movable arm 2 is first moved laterally, then gradually moved downward. At the time when the upward movement of the rod 7 comes to an end, the tip end of the movable arm 2 will be moved vertically and downwardly.

With the vertical downward movement of the movable arm 2, the electrodes 9, 10 clamp and press the workpiece 12. At the time of pressing the workpiece 12, the electodes 9, 10 are substantialy arranged in linear alignment to thereby surely press the workpiece 12 with an aid of the force applied to the workpiece at the time when the rod is moved forward.

With the arrangement of the welding gun according to the present invention, the movement of the movable arm relative to the fixed arm is effected by a single link and three pivotal pins without requiring such complicated components like the guide roller, the guide plate, the guide groove etc. as employed in the prior welding gun, whereby the parts for the welding gun are reduced, the structure of the welding gun becomes compact and small sized. Furthermore, inasmuch as the workpiece is pressed by the forward movement of the rod, the force applied to the piston in the cylinder is increased for the amount of force applied to the cross sectional area of the rod compared with the backward movement of the rod, whereby the force for pressing the workpiece is increased so that the cylinder can be small sized, and the pressure of the fluid under pressure can be reduced.

Although the invention has been described in its preferred form with a certain degree of particularity, it is to be understood that many variations and changes are possible in the invention without departing from the scope thereof.

What is claimed is:

1. A welding gun comprising:
   a fixed arm having an electrode at one end thereof and fixedly connected with a housing of a pressure cylinder at the other end thereof, and a first pin provided at a middle portion of the fixed arm, the fixed arm being swingably mounted on a base by the first pin and the pressure cylinder having a piston provided with a rod at the distal end thereof;
   a movable arm having an electrode at one end thereof, said movable arm electrode generally opposing the electrode of the fixed arm, said movable arm having a second pin at the other end thereof for pivotally connecting the movable arm to the rod of the piston, and a middle portion of the movable arm having a third pin between the electrode and the second pin; and
   the first and third pins as respectively provided at the middle portions of the fixed arm and the movable arm being sidewardly spaced apart and joined together by a pivotal link for pivotally connecting the fixed arm and the movable arm.

2. A welding gun according to claim 1, further including a stopper for restricting movement of the link.

3. A welding gun according to claim 1, wherein the pins forming the link are formed by penetrating the link.

4. A welding gun according to claim 1, wherein the pin provided at the end of the movable arm is formed by penetrating the end of the movable arm.

5. A welding gun according to claim 1, wherein the second and third pins are movable in response to movement of the piston, the second pin being movable along a path directed generally from the movable arm toward the fixed arm, the third pin being movable along a path defined generally by a circular arc centered at the first pin and having a radius defined by the distance between the first and third pins, and said one end of the movable arm being movable about the pivotal link along a composite path defined by the respective paths along which said second and third pins are movable.

6. A welding gun, comprising:
   a fixed arm having one end thereof secured to a base, said fixed arm having an electrode at the other end thereof and a first pivot pin provided at a middle portion thereof;
   a movable arm having an electrode at one end thereof, said movable arm being disposed so that its electrode is generally opposed to said fixed arm electrode, said movable arm having at its other end a second pivot pin and having a third pivot pin at a middle portion thereof between its electrode and said second pin, said third pivot pin being sidewardly spaced from said first pivot pin;
   a link member extending between and pivotally connected to said first and third pivot pins, said link member and said first and third pins forming a pivotal link between said movable and fixed arms; and
   means provided on said base and pivotally connected to said second pin for linearly moving said second pin and said other end of said movable arm so as to pivot said movable arm about said pivotal link.

7. A welding gun according to claim 6, including stopping means for restricting movement of said pivotal link.

8. A welding gun according to claim 6, wherein said first and third pins pass through said link member, and wherein said second pin passes through said other end of said movable arm.

9. A welding gun according to claim 6, wherein said second and third pins of said movable arm are movable along distinct paths in response to said moving means, said one end of said movable arm being movable about said pivotal link along a composite path defined by the respective paths along which said second and third pins are movable.

10. A welding gun according to claim 9, wherein said moving means includes a cylinder having a piston slidably disposed for reciprocal movement therein, said piston including a piston rod extending from said cylinder and pivotally connected to said movable arm at said second pin.

* * * * *